United States Patent [19]

Jensen

[11] Patent Number: 5,265,992
[45] Date of Patent: Nov. 30, 1993

[54] TIE DOWN FITTING FOR RETAINING OBJECTS TO THE FLOOR OR SIDE WALL OF A VEHICLE

[75] Inventor: Richard H. Jensen, Torrance, Calif.
[73] Assignee: Ancra Corporation, Hawthorne, Calif.
[21] Appl. No.: 614,378
[22] Filed: Nov. 15, 1990
[51] Int. Cl.$^5$ .............................................. B60P 7/08
[52] U.S. Cl. ................................. 410/116; 410/104; 410/115
[58] Field of Search ................ 410/104, 105, 101, 96, 410/107, 115, 116, 78, 79

[56] References Cited

U.S. PATENT DOCUMENTS

| | | | |
|---|---|---|---|
| 2,736,272 | 2/1956 | Elsner | 410/105 |
| 3,252,681 | 5/1966 | Watts | 410/116 |
| 3,344,749 | 10/1967 | Bass et al. | 410/105 |
| 3,381,925 | 5/1968 | Higuchi | 410/116 |
| 3,480,239 | 11/1969 | Jensen et al. | 410/79 |
| 3,570,415 | 3/1971 | Drinnon | 410/115 X |
| 3,605,637 | 9/1971 | Prete | 410/105 |
| 4,277,212 | 7/1981 | Rosaia | 410/78 |
| 4,509,888 | 4/1985 | Sheek | 410/105 |
| 4,838,743 | 6/1989 | Blunden et al. | 410/30 X |
| 4,850,769 | 7/1989 | Matthews | 410/105 |
| 4,867,623 | 9/1989 | Loyd | 410/105 |
| 4,954,031 | 9/1990 | Geeck | 410/116 X |

FOREIGN PATENT DOCUMENTS 204238 7/1956 Australia .

*Primary Examiner*—Michael S. Huppert
*Assistant Examiner*—Stephen Gordon
*Attorney, Agent, or Firm*—Edward A. Sokolski

[57] ABSTRACT

A tie down fitting is adapted to fit into a cutout or hole formed in a track or the like installed on the floor of a vehicle. The fitting has a pair of slotted portions which fit into the cutout in engagement with the end edges thereof. A spring actuated plunger is provided on the fitting which when manually raised permits the slotted portions to be fitted in the cutout and after being so fitted limits motion of the fitting thereby retaining the fitting in the cutout. In one embodiment of the invention, a latch formed with a protrusion on the plunger and a pair of rivets on the main body of the fitting provide upper and lower limit stops for the plunger.

7 Claims, 1 Drawing Sheet

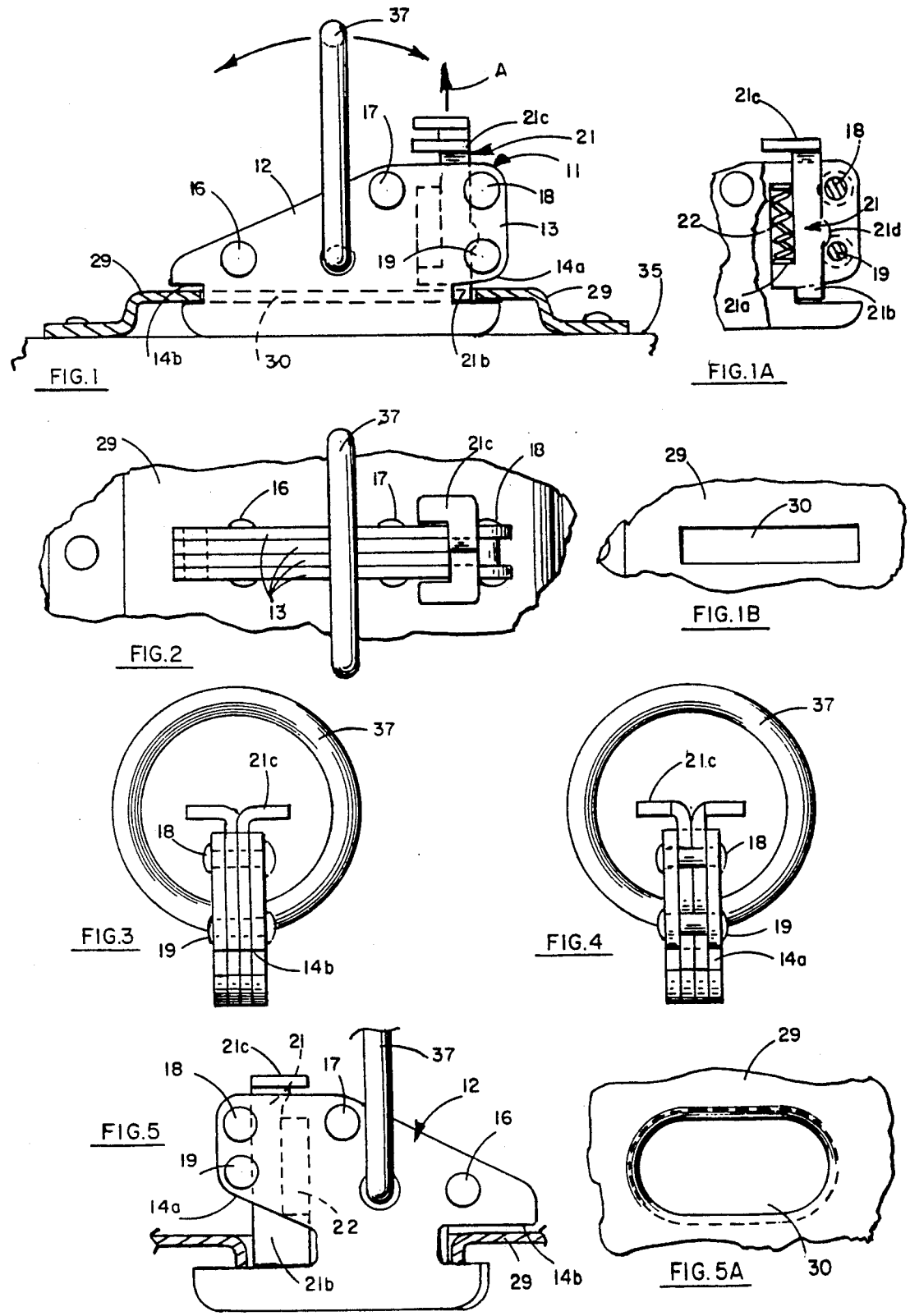

5,265,992

TIE DOWN FITTING FOR RETAINING OBJECTS TO THE FLOOR OR SIDE WALL OF A VEHICLE

BACKGROUND OF THE INVENTION

1. Field of the Invention

This invention relates to tie down fittings for retaining objects in a vehicle and more particularly to such a device which can be removably installed in cutouts formed in the vehicle floor, or side wall or into tracks attached to the floor or side wall.

2. Description of the Related Art

In vehicles such as vans, busses and aircraft, it is necessary to adapt the vehicle for handling either passengers or cargo. It is also necessary to accommodate passengers in wheelchairs. The normal passenger seats are usually secured in place. However, with the handling of wheelchairs and cargo, means for rapidly securing these objects to and releasing them from the vehicle floor must be provided. It is essential that such tie-down devices firmly secure the objects in place under any sort of motion which might be encountered during travel.

Various anchor fittings have been developed in the prior art for removably attaching objects to the floor or wall of a vehicle. Many of these are adapted particularly for use in aircraft and operate in conjunction with a track attached to the aircraft floor, this track having alternate notch and neck portions which matingly engage the fitting. Such devices are described, for example, in Jensen U.S. Pat. No. 4,708,549 issued Nov. 24, 1987; Knox et al. No. 4,256,424 issued Mar. 17, 1981; Howell No. 4,230,432 issued Oct. 28, 1980; and Parker No. 2,688,504 issued Sep. 7, 1954. These devices while providing good retaining action in the track employed generally lack the ease and rapidity of installation to be desired, particularly where many of such fittings need to be installed.

BRIEF SUMMARY OF THE INVENTION

The device of the present invention provides a simple and easily operated tie down fitting which can be rapidly installed in a cutout or in a mounting plate such as a track or the like attached to the floor of a vehicle. This fitting has a pair of slotted portions formed in the opposite ends of the bottom portion thereof. These slotted portions are adapted to fit into the opposite end edges of the cutout in a loose overlapping manner. A spring actuated plunger is mounted for vertical sliding motion in the fitting, this plunger being urged downwardly by the spring towards one of the end edges of the cutout. When installing the fitting in the cutout, the plunger is manually drawn upward to permit the slotted portions of the fitting to loosely overlap the end edges of the cutout. A space is provided between the slotted portion directly beneath the plunger so that when the plunger is released against its spring tension, the plunger fills this space between the end edge of the cutout and the inner wall of the associated slotted portion, thereby retaining the fitting in the cutout. The fitting can be released from its retention in the cutout merely by manually raising the plunger to permit the slotted portions to be withdrawn from the cutout.

BRIEF DESCRIPTION OF THE DRAWINGS

FIG. 1 is a side elevational view of a first embodiment of the invention;

FIG. 1A is a partial cutaway view showing the plunger of the first embodiment;

FIG 1B is a top plan view of a portion of a track having a cutout therein in which the first embodiment can be installed;

FIG. 2 is a top plan view of the first embodiment;

FIG. 3 is an end elevational view of the first embodiment;

FIG. 4 is an end elevational view of the first embodiment taken from the end opposite to that shown in FIG. 3.

FIG. 5 is a side elevational view of a second embodiment of the invention; and

FIG. 5A is a top plan view of a portion of a track having a cutout formed therein in which the second embodiment may be installed.

DETAILED DESCRIPTION OF THE INVENTION

Referring now to FIGS. 1-4, a first embodiment of the invention is shown. Fitting 11 has a main body portion 12 which is formed by a plurality of similar plates 13 which are joined together by means of rivets 16-19. The bottom of the main the opposite ends thereof. Plunger 21 is slidably mounted in the main body portion and spring urged downwardly by spring 22 which is mounted between an inner wall of the plates and a ledge portion 21a formed on the plunger.

The fitting is installed in a rectangular cutout 30 formed in a track or other form of raised mounting plate 29 attached to the floor or side wall 35 of a vehicle such as a bus, van, or aircraft with the end edges of the cutouts fitted in slots 14a and 14b. As can be seen in FIG. 1, the fitting is securely retained to the track 29 by virtue of the close fit between the end 21b of the plunger and the end edge of cutout 30 which limits motion of the fitting, upward motion being restrained by the walls of the slotted portions 14a and 14b. The fitting can readily be removed from the cutout merely by pulling upwardly on the handle portion 21c of the plunger against the tension of spring 22, as indicated by arrow "A". This causes the end 21b of the plunger to be withdrawn from slot 14a, permitting sufficient motion of the fitting to allow its withdrawal from cutout 30.

Plunger 21 has a protrusion 21d formed thereon which abuts against rivets 18 and 19 in its upward and downward travel respectively, thereby providing upper and lower limits for the travel of the plunger, to facilitate its operation. A ring 37 is attached to the fitting to which an object such as a webbing strap, a wheelchair tiedown or a cargo securement strap can be secured to retain such object to the floor of the vehicle.

Referring now to FIGS. 5 and 5A, a second embodiment of the invention and a support plate member to which this fitting may be retained are respectively shown. This second embodiment is similar to the first except for the absence of a protuberance on the plunger which operates to limit the travel of the plunger. This embodiment also has a wider slot 14a into which the end portion 21b of the plunger fits, this facilitating its operation with wider oval shaped cutouts 30, as shown in FIG. 5A. Otherwise, the device of the second embodiment operates in the same manner as that of the first embodiment.

The device of the invention thus provides a simple attachment fitting which can be operated easily and rapidly in attaching an object to the floor or side wall of a vehicle and retaining such object in place during travel of the vehicle.

While the invention has been described and illustrated in detail, it is to be clearly understood that this is intended by way of illustration and example only and is not to be taken by way of limitation, the scope of the invention being limited only by the terms of the following claims.

I claim:

1. A tie down fitting for use in securing an object to a mounting member having a cutout therein with opposing end edges, said mounting member being attached to or integrally formed in a vehicle, said fitting comprising:
    a main body portion having a pair of slots formed in the opposite longitudinal ends of the bottom portion thereof;
    a plunger slidably mounted in said main body portion, said plunger having a protuberance formed thereon, said main body portion having a pair of spaced apart stop members thereon, said protuberance abutting against one of said stop members in an upper limit position for said plunger and the other of said stop members in a lower limit position thereof;
    spring means for urging said plunger towards the bottom portion of the main body portion; and
    means attached to said fitting for retaining the object thereto;
    each of the end edges of said cutout being fitted into a respective one of said slots with said plunger being positioned in one of said slots opposite one of said cutout end edges thereby securing said fitting to said mounting member, said fitting being removable from said mounting member when said plunger is lifted out of said cutout.

2. The device of claim 1 wherein said mounting member comprises tracks mounted on the floor or side wall of said vehicle.

3. The fitting of claim 1 wherein the cutout is oval shaped.

4. The fitting of claim 1 wherein said cutout is rectangular in shape.

5. The fitting of claim 1 wherein said main body portion is formed by a plurality of flat plates and a plurality of rivets joining said plates together.

6. The fitting of claim 1 and further including handle means on one end of said plunger for use in raising said plunger.

7. The fitting of claim 1 wherein said main body portion is formed by a plurality of flat plates and a plurality of rivets joining said plates together, a pair of said rivets forming said stop members.

* * * * *